(12) United States Patent
Weng et al.

(10) Patent No.: US 7,911,720 B2
(45) Date of Patent: Mar. 22, 2011

(54) LENS MODULE

(75) Inventors: Nien-Ting Weng, Taipei (TW); An-Shun Cheng, Taipei (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 12/694,277

(22) Filed: Jan. 27, 2010

(65) Prior Publication Data

US 2011/0026145 A1  Feb. 3, 2011

(30) Foreign Application Priority Data

Jul. 31, 2009  (TW) ............................ 98214102 U

(51) Int. Cl.
*G02B 7/02* (2006.01)
(52) U.S. Cl. .................... 359/819; 359/808
(58) Field of Classification Search .............. 359/819
See application file for complete search history.

(56) References Cited

U.S. PATENT DOCUMENTS

| 2003/0128442 A1* | 7/2003 | Tanaka et al. ............ 359/819 |
| 2007/0248355 A1* | 10/2007 | Lee ........................... 396/529 |
| 2010/0165183 A1* | 7/2010 | Tian ......................... 348/374 |

* cited by examiner

*Primary Examiner* — Jordan M. Schwartz
*Assistant Examiner* — James C Jones

(57) ABSTRACT

A lens module for being fixed to a substrate by UV glues includes a lens barrel and a lens holder integratedly formed at a bottom of the lens barrel. The lens barrel has a hollow receiving groove for receiving an optical lens therein. The lens holder defines a containing cavity communicating with the receiving groove and penetrating through a bottom thereof to form a plurality of inner walls surrounding the containing cavity. The lens holder further defines a plurality of outer pillars spaced from each other and arranged apart from outer peripheries of the corresponding inner walls to define gaps therebetween. The UV glues are distributed to a bottom of each outer pillar so that ultraviolet lights can pass through the intervals between the outer pillars to adequately irradiate and solidify the UV glues for making the lens module fixed to the substrate firmly.

2 Claims, 5 Drawing Sheets

__LENS MODULE__

BACKGROUND OF THE INVENTION

1. Field of the Invention

The present invention relates to a lens module, and more particularly to a lens module having improved structure capable of being fixed to a substrate that carries an image detector firmly and rapidly.

2. The Related Art

The so-called UV glue is a kind of adhesive that needs to be irradiated with ultraviolet light to achieve a solidification effect. It has been widely used in electronics and optoelectronics industries for fixing electronic components or lens modules because of its special property of strong adhesion, rapid solidification, small shrinkage and the like.

In general, a conventional lens module 100' as shown in FIG. 9 includes a lens barrel 21' and a lens holder 22' integratedly formed at a bottom of the lens barrel 21'. The lens barrel 21' has a hollow receiving groove 211' for receiving an optical lens 23' therein. The lens holder 22' defines a containing cavity 221' communicating with the receiving groove 211' and penetrating through a bottom thereof. When the conventional lens module 100' is to be fixed to a substrate 1' which has an image detector 3' fixed at a center thereof, UV glues 4' are distributed around the lens holder 22', then ultraviolet lights (not shown) are used to irradiate and solidify the UV glues 4' to make the conventional lens module 100' fixed to the substrate 1'.

However, the UV glues 4' will spread to the containing cavity 221' during distributing the UV glues 4' to the lens holder 22', and the ultraviolet lights can not irradiate the UV glues 4' which spread to the containing cavity 221'. As a result, the UV glues 4' can not be solidified completely, and consequently, the conventional lens module 100' is fixed to the substrate 1' unstably.

SUMMARY OF THE INVENTION

It is an object of the present invention to provide a lens module having improved structure capable of being fixed to a substrate that carries carry an image detector firmly and rapidly. In order to achieve above-mentioned object, the lens module of the present invention for being fixed to a substrate by UV gules includes a lens barrel and a lens holder integratedly formed at a bottom of the lens barrel. The lens barrel has a hollow receiving groove for receiving an optical lens therein. The lens holder defines a containing cavity communicating with the receiving groove and penetrating through a bottom thereof to form a plurality of inner walls surrounding the containing cavity. The lens holder further defines a plurality of outer pillars spaced from each other and arranged apart from outer peripheries of the corresponding inner walls to define gaps therebetween. The UV glues are distributed to a bottom of each outer pillar so that ultraviolet lights can pass through the intervals between the outer pillars to adequately irradiate and solidify the UV glues for making the lens module fixed to the substrate firmly.

As described above, because the outer pillars are spaced from each other and the UV glues are distributed to the outer pillars but not the inner walls, the ultraviolet lights can pass through the intervals between the outer pillars to adequately irradiate the UV glues and make the UV glues solidified entirely. Therefore, the lens module is fixed to the substrate firmly.

BRIEF DESCRIPTION OF THE DRAWINGS

The present invention will be apparent to those skilled in the art by reading the following description of embodiments thereof, with reference to the attached drawings, in which.

DETAILED DESCRIPTION OF THE PREFERRED EMBODIMENT

Figure 1:
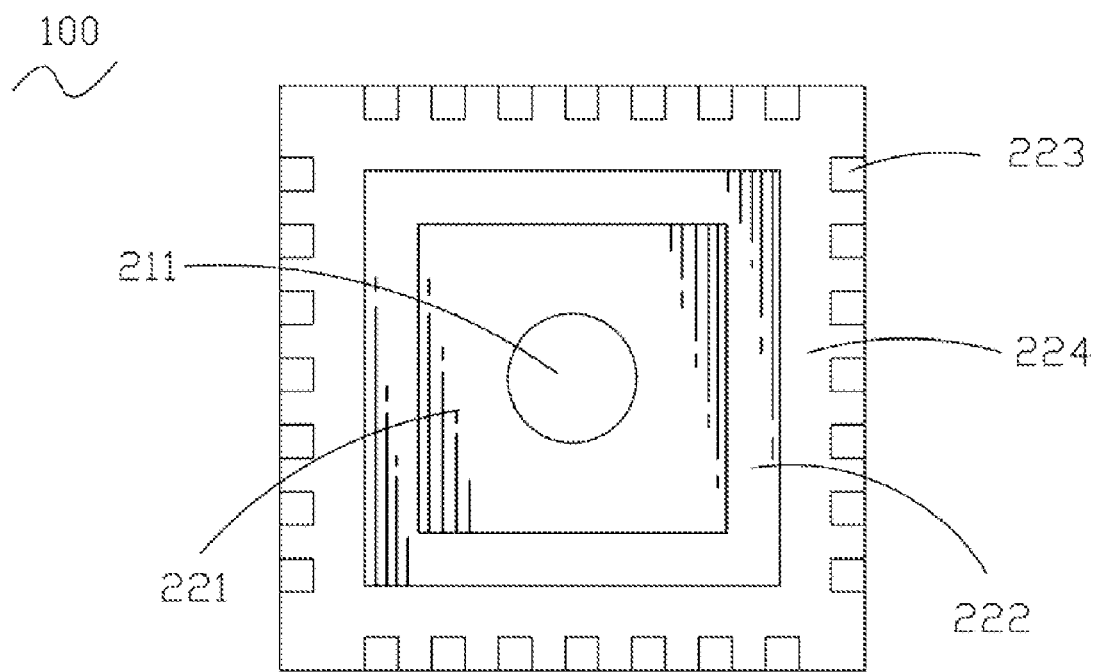
FIG. 1 is a bottom plan view of one embodiment of a lens module in accordance with the present invention.
Figure 2:
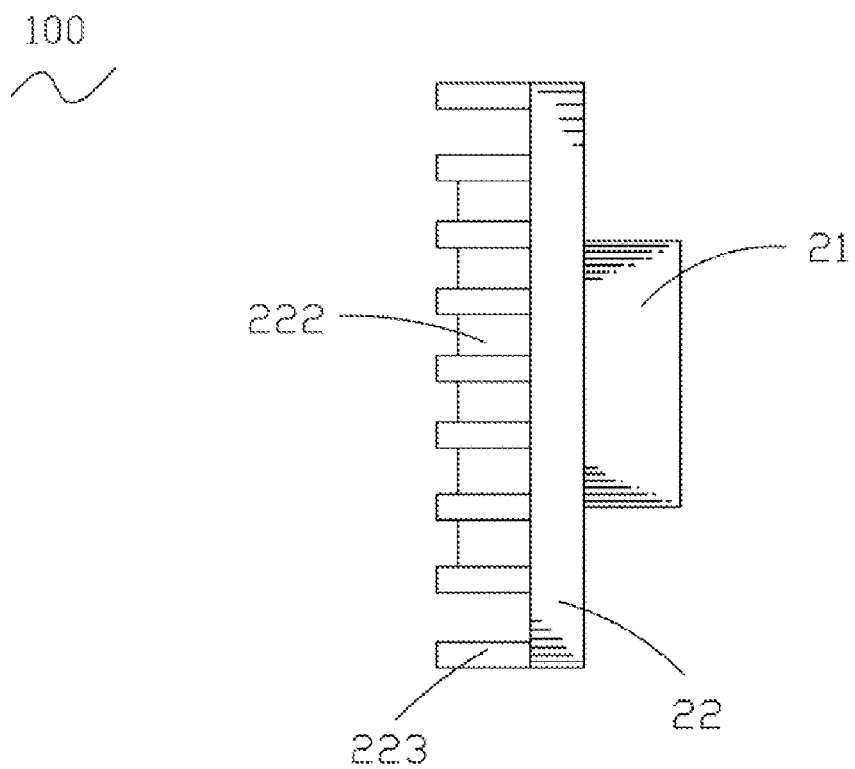
FIG. 2 is a left side elevation view of the lens module shown in FIG. 1.
Figure 3:
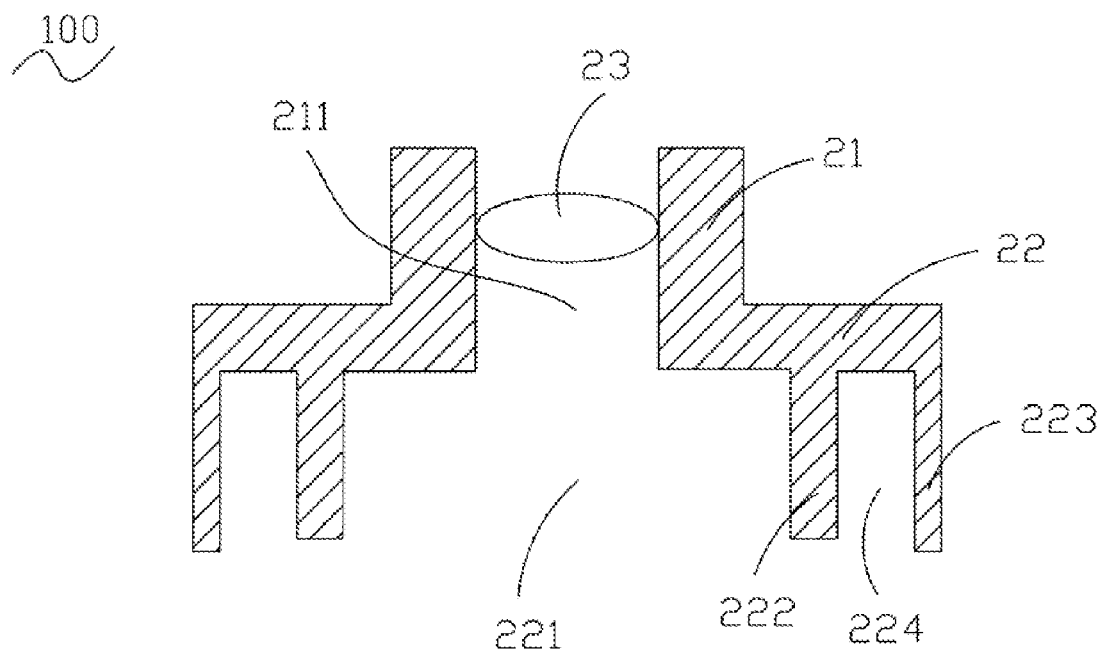
FIG. 3 is a cross-sectional view of the lens module shown in FIG. 1.

With reference to FIGS. 1 and 3, one embodiment of a lens module 100 according to the present invention is shown. The lens module 100 includes a substantially cylindrical lens barrel 21 and a substantially rectangular lens holder 22 integratedly formed at a bottom of the lens barrel 21. The lens barrel 21 has a hollow receiving groove 211 for receiving an optical lens 23 therein. The lens holder 22 defines a containing cavity 221 communicating with the receiving groove 211 and penetrating through a bottom thereof to form a plurality of inner walls 222 surrounding the containing cavity 221. The lens holder 22 further defines a plurality of outer pillars 223 spaced from each other and arranged apart from outer peripheries of the corresponding inner walls 222 to define gaps 224 therebetween. In this embodiment, a cross-section of the outer pillar 223 is of substantial square shape.

Figure 4:
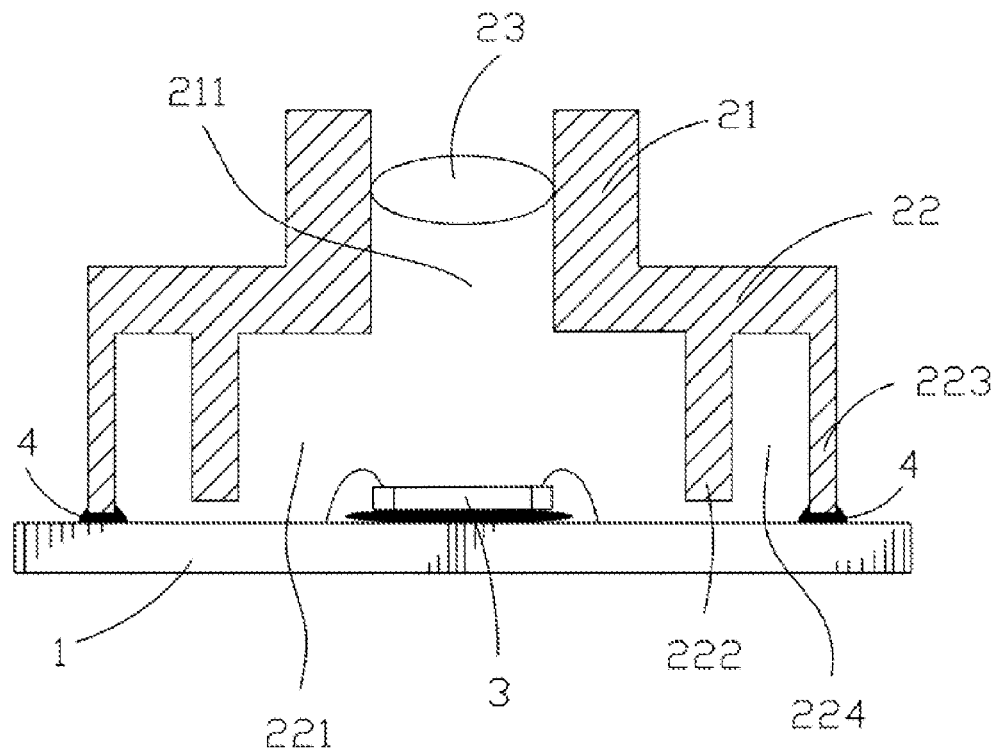
FIG. 4 is a cross-sectional view showing the lens module fixed to a substrate.

Referring to FIG. 4, before the lens module 100 is fixed to a substrate 1 which has an image detector 3 fixed at a center thereof, a focusing device (not shown) is used to clip the lens module 100 to adjust the optical lens 23 to make the optical lens 23 accurately focus on the image detector 3. In this case, the image detector 3 is accommodated in the containing cavity 221. After that, UV glues 4 are distributed to a bottom of each outer pillar 223 for gluing the lens module 100 to the substrate 1. And then, the UV glues 4 are irradiated with ultraviolet lights (not shown) to solidify the UV glues 4. When the UV glues 4 are solidified entirely, the lens module 100 is firmly fixed to the substrate 1. Finally, the focusing device is removed after the assembly of the lens module 100 and the substrate 1 is finished.

Because the outer pillars 223 are spaced from each other and the UV glues 4 are distributed to the outer pillars 223 but not the inner walls 222, the ultraviolet lights can pass through the intervals between the outer pillars 223 to adequately irradiate the UV glues 4 and make the UV glues 4 solidified entirely. Therefore, the lens module 100 is fixed to the substrate 1 firmly.

Figure 5:
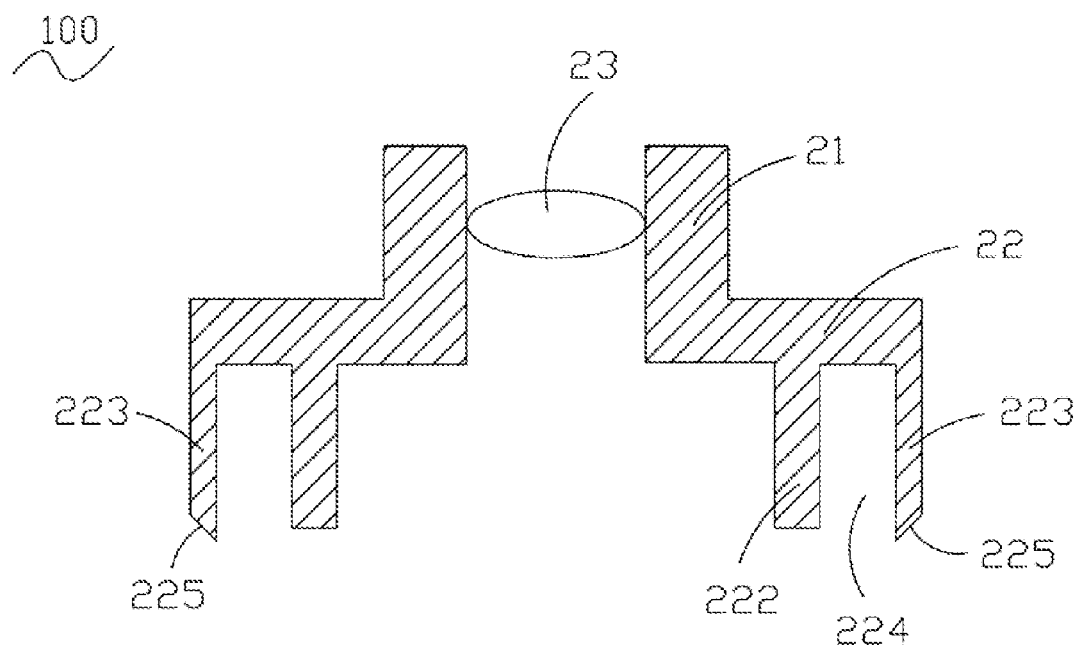
FIG. 5 is a cross-sectional view of another embodiment of the lens module in accordance with the present invention.

FIG. 5 shows another embodiment of the present invention, the lens module 100 of this embodiment is an improvement structure with respect to the aforementioned embodiment shown in FIG. 3. The improvement is that an outside of the bottom of the outer pillar 223 is cut off to form a bevel angle 225. Thus, the UV glues 4 can be irradiated easier by the ultraviolet lights.

Figure 6:
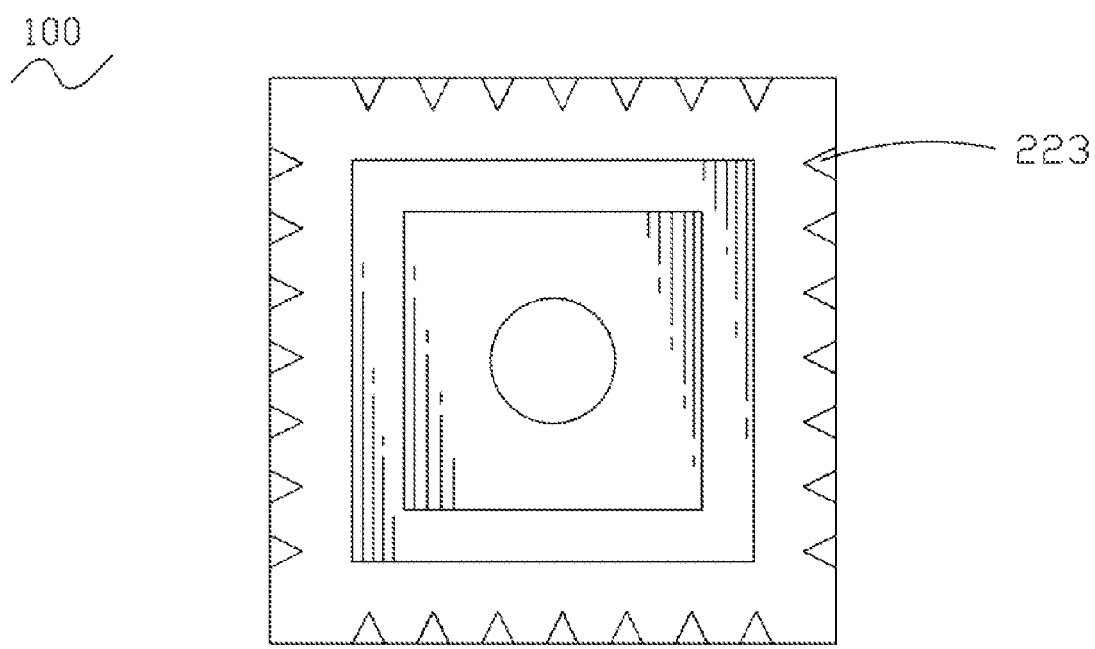
FIGS. 6 to 8 are bottom plan views of other different embodiments of the lens modules in accordance with the present invention.
Figure 7:
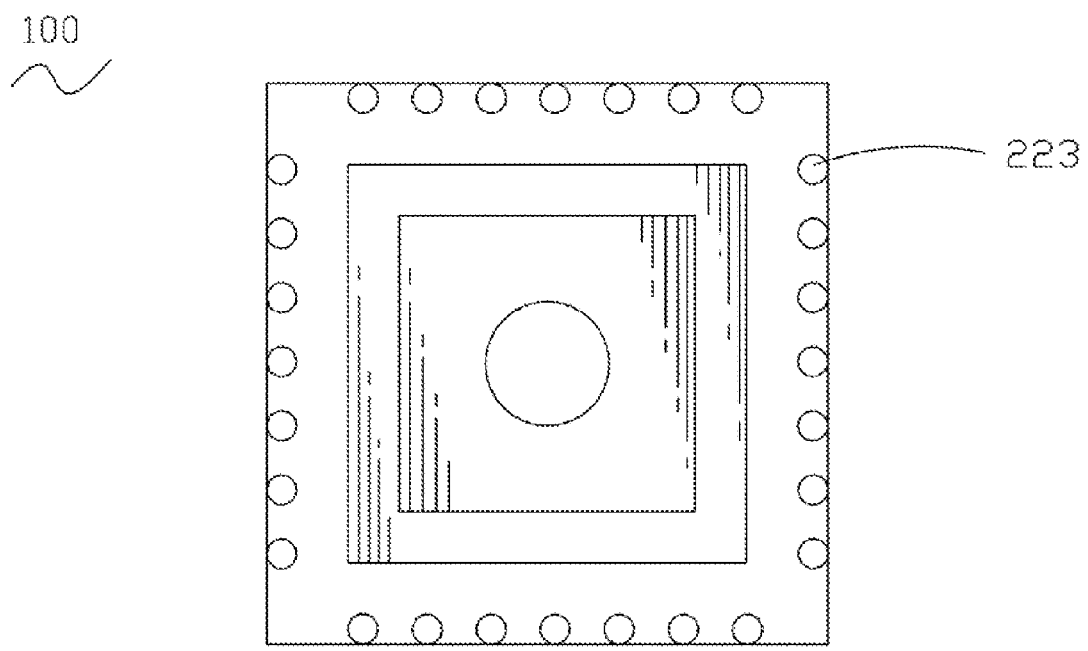
Figure 8:
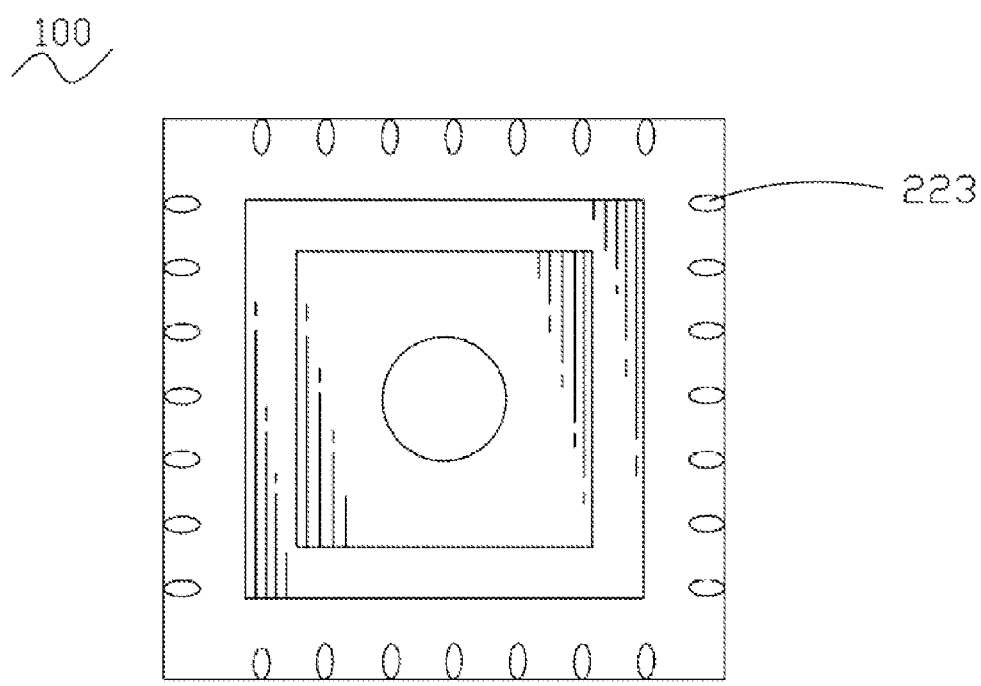
Figure 9:
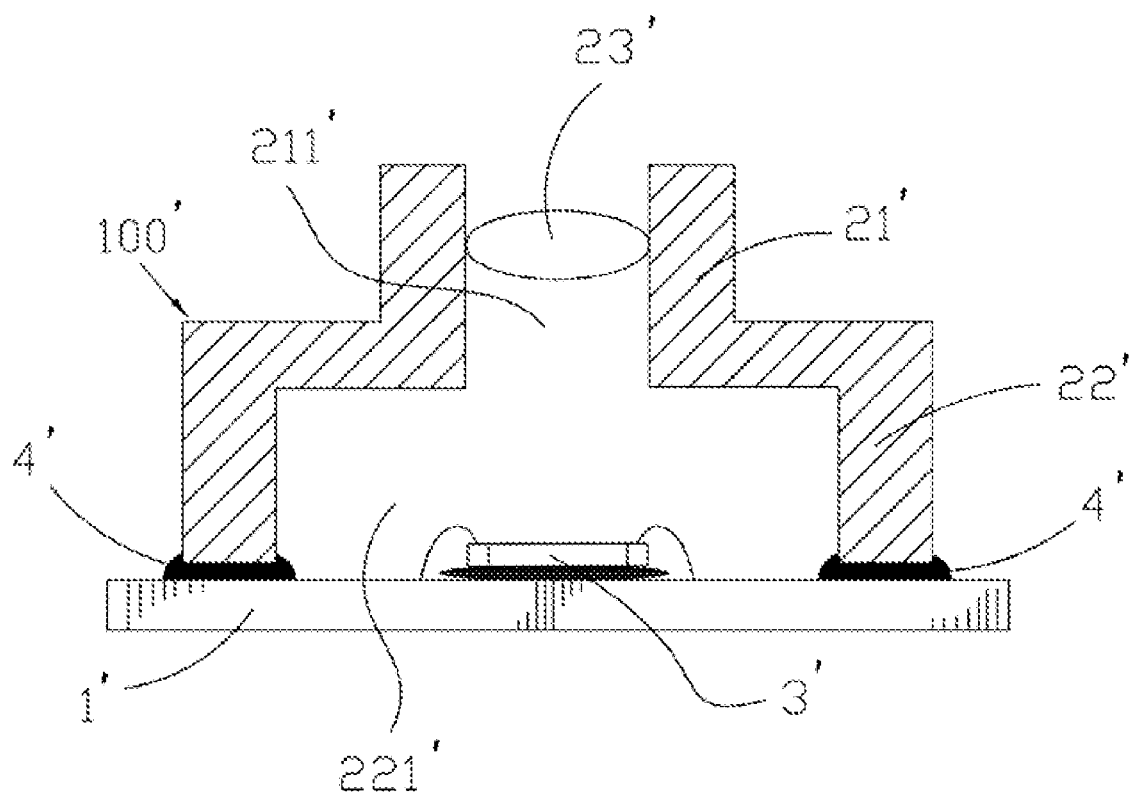
FIG. 9 is a cross-sectional view showing a conventional lens module fixed to a substrate.

FIGS. 6 to 8 are other different embodiments of the lens modules 100 according to the present invention. The differences between these embodiments and the aforementioned embodiment shown in FIG. 1 are that the cross-sections of the outer pillars 223 have different shapes. As shown in FIG. 5, the cross-section of the outer pillar 223 is of substantial triangle shape with an acute angle thereof pointing towards the inner wall 222. In FIG. 6, the cross-section of the outer pillar 223 is of substantial circle shape, and in FIG. 7, the cross-section of the outer pillar 223 is of substantial ellipse shape with a major axis thereof perpendicular to the inner wall 222. Furthermore, in terms of irradiation effect, the embodiment of the lens module 100 shown in FIG. 5 in which the cross-section of the outer pillar 223 is of substantial triangle shape can achieve the best irradiation effect when using the ultraviolet lights to irradiate and solidify the UV glues 4. Besides, the design of the bevel angle 225 of the embodiment shown in FIG. 5 can also be applied to the embodiments shown in FIGS. 6-8.

As described above, because the outer pillars 223 are spaced from each other and the UV glues 4 are distributed to the outer pillars 223 but not the inner walls 222, the ultraviolet lights can pass through the intervals between the outer pillars 223 to adequately irradiate the UV glues 4 and make the UV glues 4 solidified entirely. Therefore, the lens module 100 is fixed to the substrate 1 firmly.

What is claimed is:

1. A lens module for being fixed to a substrate by UV glues, comprising:
   a lens barrel having a hollow receiving groove for receiving an optical lens therein; and
   a lens holder integratedly formed at a bottom of the lens barrel, the lens holder defining a containing cavity communicating with the receiving groove and penetrating through a bottom thereof to form a plurality of inner walls surrounding the containing cavity, the lens holder further defining a plurality of outer pillars spaced from each other and arranged apart from outer peripheries of the corresponding inner walls to define gaps therebetween, a cross-section of each outer pillar being of substantial triangle shape with an acute angle thereof pointing towards the corresponding inner wall;
   wherein the UV glues are distributed to a bottom of each outer pillar so that ultraviolet lights can pass through intervals between the outer pillars to irradiate and solidify the UV glues for making the lens module fixed to the substrate.

2. A lens module for being fixed to a substrate by UV glues, comprising:
   a lens barrel having a hollow receiving groove for receiving an optical lens therein; and
   a lens holder integratedly formed at a bottom of the lens barrel, the lens holder defining a containing cavity communicating with the receiving groove and penetrating through a bottom thereof to form a plurality of inner walls surrounding the containing cavity, the lens holder further defining a plurality of outer pillars spaced from each other and arranged apart from outer peripheries of the corresponding inner walls to define gaps therebetween, a cross-section of each outer pillar being of substantial ellipse shape with a major axis thereof perpendicular to the corresponding inner wall;
   wherein the UV glues are distributed to a bottom of each outer pillar so that ultraviolet lights can pass through intervals between the outer pillars to irradiate and solidify the UV glues for making the lens module fixed to the substrate.

* * * * *